United States Patent
Error

(10) Patent No.: US 8,578,041 B2
(45) Date of Patent: Nov. 5, 2013

(54) VARIABLE SAMPLING RATES FOR WEBSITE VISITATION ANALYSIS

(75) Inventor: Christopher Reid Error, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 2408 days.

(21) Appl. No.: 11/319,337

(22) Filed: Dec. 27, 2005

(65) Prior Publication Data

US 2006/0274763 A1    Dec. 7, 2006

Related U.S. Application Data

(60) Provisional application No. 60/687,633, filed on Jun. 3, 2005, provisional application No. 60/688,076, filed on Jun. 6, 2005.

(51) Int. Cl.
*G06F 15/16* (2006.01)

(52) U.S. Cl.
USPC ............................ 709/231; 709/223; 709/229

(58) Field of Classification Search
USPC .......................................... 709/231, 223, 229
See application file for complete search history.

(56) References Cited

U.S. PATENT DOCUMENTS

| | | | |
|---|---|---|---|
| 5,760,772 A | 6/1998 | Austin | |
| 5,796,402 A | 8/1998 | Ellison-Taylor | |
| 5,821,931 A | 10/1998 | Berquist et al. | |
| 5,835,087 A | 11/1998 | Herz et al. | |
| 5,870,559 A | 2/1999 | Leshem et al. | |
| 5,966,139 A | 10/1999 | Anupam et al. | |
| 6,008,809 A | 12/1999 | Brooks | |
| 6,026,397 A | 2/2000 | Sheppard | |
| 6,182,097 B1 | 1/2001 | Hansen et al. | |
| 6,188,405 B1 | 2/2001 | Czerwinski et al. | |
| 6,266,649 B1 | 7/2001 | Linden et al. | |
| 6,310,631 B1 | 10/2001 | Cecco et al. | |

(Continued)

FOREIGN PATENT DOCUMENTS

| | | |
|---|---|---|
| WO | WO 00/58866 A | 10/2000 |
| WO | WO 02/23438 A2 | 3/2002 |

OTHER PUBLICATIONS

A Passive Test and Measurement System: Traffic Sampling for QoS Evaluation; Cozzani et al., Department of Information Engineering, University of Pisa, Italy, 1998 IEEE, pp. 1236-1241.*
U.S. Appl. No. 10/113,808, filed Mar. 29, 2002, Wiles, Jr.

(Continued)

*Primary Examiner* — Hua Fan
*Assistant Examiner* — Van Kim T Nguyen
(74) *Attorney, Agent, or Firm* — Kilpatrick Townsend & Stockton LLP

(57) ABSTRACT

A data set containing website traffic data or other data is sampled according to a variable sample rate. A target number of samples per time period is established, and a baseline sample rate is determined. Data items in the data set are sampled according to the baseline sample rate, to obtain a sample set. For time periods where the size of the resulting sample set exceeds the target number of samples, a new sample rate is established and the data items for the time period are resampled. Appropriate sampling capability can thus be provided for website traffic in normal time periods, while maintaining capability for handling spikes and other variations in website traffic as may take place in response to certain periodic or non-periodic events.

43 Claims, 3 Drawing Sheets

(56) References Cited

U.S. PATENT DOCUMENTS

| | | | |
|---|---|---|---|
| 6,393,479 B1 | 5/2002 | Glommen et al. | |
| 6,414,677 B1 | 7/2002 | Robertson et al. | |
| 6,473,102 B1 | 10/2002 | Rodden et al. | |
| 6,489,968 B1 | 12/2002 | Ortega et al. | |
| 6,594,694 B1* | 7/2003 | Najork et al. | 709/219 |
| 6,654,036 B1 | 11/2003 | Jones | |
| 6,671,711 B1 | 12/2003 | Pirolli et al. | |
| 6,704,016 B1 | 3/2004 | Oliver et al. | |
| 6,741,990 B2* | 5/2004 | Nair et al. | 1/1 |
| 6,754,873 B1 | 6/2004 | Law et al. | |
| 6,766,370 B2 | 7/2004 | Glommen et al. | |
| 6,792,458 B1* | 9/2004 | Muret et al. | 709/224 |
| 6,801,945 B2* | 10/2004 | Lin et al. | 709/229 |
| 6,823,380 B1* | 11/2004 | Nace et al. | 709/224 |
| 6,850,988 B1 | 2/2005 | Reed | |
| 6,862,574 B1 | 3/2005 | Srikant et al. | |
| 6,950,993 B2 | 9/2005 | Breinberg | |
| 6,963,874 B2 | 11/2005 | Kasriel et al. | |
| 6,968,511 B1 | 11/2005 | Robertson et al. | |
| 6,980,962 B1 | 12/2005 | Arganbright et al. | |
| 7,185,085 B2* | 2/2007 | Bean | 709/224 |
| 7,318,056 B2* | 1/2008 | Taniguchi et al. | 709/219 |
| 7,334,005 B2* | 2/2008 | Sobel | 1/1 |
| 7,536,455 B2* | 5/2009 | Duffield et al. | 709/223 |
| 7,565,366 B2* | 7/2009 | Garg | 1/1 |
| 7,630,862 B2* | 12/2009 | Glas et al. | 702/186 |
| 2002/0016731 A1* | 2/2002 | Kupersmit | 705/10 |
| 2002/0040395 A1 | 4/2002 | Davis et al. | |
| 2002/0042750 A1 | 4/2002 | Morrison | |
| 2002/0087621 A1 | 7/2002 | Hendriks | |
| 2002/0091591 A1 | 7/2002 | Tsumura et al. | |
| 2002/0093529 A1 | 7/2002 | Daoud et al. | |
| 2002/0099812 A1 | 7/2002 | Davis et al. | |
| 2002/0147570 A1* | 10/2002 | Kraft et al. | 702/186 |
| 2002/0152284 A1 | 10/2002 | Cambray et al. | |
| 2002/0165936 A1 | 11/2002 | Alston et al. | |
| 2002/0186237 A1 | 12/2002 | Bradley et al. | |
| 2002/0186253 A1 | 12/2002 | Rodden et al. | |
| 2002/0198939 A1 | 12/2002 | Lee et al. | |
| 2003/0023712 A1 | 1/2003 | Zhao et al. | |
| 2003/0025737 A1 | 2/2003 | Breinberg | |
| 2003/0055883 A1 | 3/2003 | Wiles, Jr. | |
| 2003/0128231 A1 | 7/2003 | Kasriel et al. | |
| 2003/0131097 A1 | 7/2003 | Kasriel et al. | |
| 2003/0144868 A1* | 7/2003 | MacIntyre et al. | 705/1 |
| 2004/0049417 A1 | 3/2004 | Nickerson et al. | |
| 2004/0133671 A1 | 7/2004 | Taniguchi | |
| 2004/0205157 A1 | 10/2004 | Bibelnieks et al. | |
| 2005/0044508 A1 | 2/2005 | Stockton | |
| 2005/0204307 A1 | 9/2005 | Nadal | |
| 2005/0229110 A1 | 10/2005 | Gegner et al. | |
| 2005/0235222 A1 | 10/2005 | Barbanson et al. | |
| 2005/0273727 A1 | 12/2005 | Barbanson et al. | |

OTHER PUBLICATIONS

U.S. Appl. No. 10/113,322, filed Mar. 29, 2002, Zhao et al.
U.S. Appl. No. 10/057,513, filed Jan. 25, 2002, Alston et al.
U.S. Appl. No. 09/835,112, filed Apr. 13, 2001, Cambray et al.
Hong, J. et al., "What Did They Do? Understanding Clickstreams with the WebQuilt Visualization System," WebQuilt homepage http://guir.berkeley.edu/projects/webquilt/, pp. 1-7, AVI'02, May 22-24, 2002.
Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.
Notification of International Search Report and Written Opinion, PCT/US04/39253, Dec. 13, 2005, 13 pages.
Notification of International Search Report and Written Opinion, PCT/US04/06898, Feb. 9, 2005, 8 pages.
Notification of International Search Report and Written Opinion, PCT/US04/06696, Feb. 28, 2005, 9 pages.
Supplementary European Search Report, EP 04717485, Nov. 7, 2006, 3 pages.

* cited by examiner

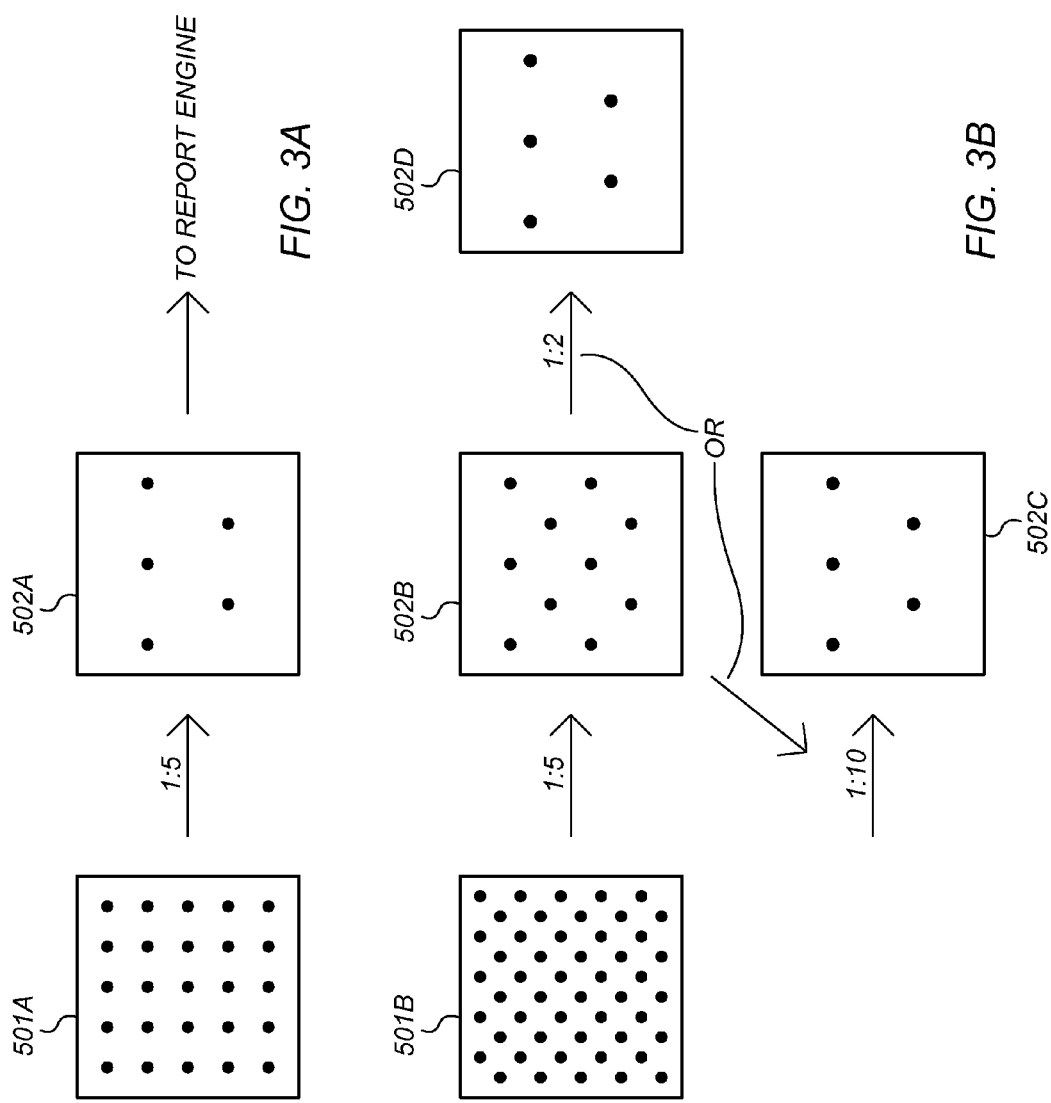

VARIABLE SAMPLING RATES FOR WEBSITE VISITATION ANALYSIS

CROSS-REFERENCE TO RELATED APPLICATIONS

The present application claims priority from U.S. Provisional patent application Ser. No. 60/687,633, for "Sampling Technique for Web Usage Analysis," filed Jun. 3, 2005, the disclosure of which is incorporated herein by reference.

The present application further claims priority from U.S. Provisional patent application Ser. No. 60/688,076, for "Website Traffic Analysis Engine and User Interface", filed Jun. 6, 2005, the disclosure of which is incorporated herein by reference.

The present application is related to U.S. Utility patent application Ser. No. 10/609,008, for "Capturing and Presenting Site Visitation Path Data," filed Jun. 27, 2003, the disclosure of which is incorporated herein by reference.

FIELD OF THE INVENTION

The present invention relates generally to tracking website usage, and more particularly to variable sample rates for website visitation analysis.

BACKGROUND OF THE INVENTION

Web analytics refers to the analysis of data associated with website visitation. For instance, web analytics can be used to mine visitor traffic data. A variety of visitor traffic data is measured such as what browser is being used, what links on a given web page were selected, whether a product was purchased, and the like. There are number of web analytics tools presently available such as Site Catalyst version 11 from Omniture of Orem, Utah. These tools are able to capture data on website usage, and responsive to a user's request display a variety of different metrics on website usage such fallout/conversion, A/B testing, and the like.

Typically, such web analytics tools generate website visitation reports that are useful to website administrators and other individuals who wish to determine how many visitors a site is attracting, as well as the characteristics and behavior of those individuals.

In order to provide accurate statistical reporting on website visitation by a large number of visitors, sampling techniques are usually applied. A processing module monitors visits to a website, for example by consulting server logs, and performs a sampling operation to discard some of the visitation data while retaining a representative sample. This representative sample is then used in constructing reports to be presented to a user such as a website administrator.

For certain types of websites, dramatic spikes in website visitation can take place frequently. For example, a website providing information on the NFL Superbowl may experience a sizable increase in traffic during the time period surrounding the annual event. In some cases, such as those in which a normally obscure website is thrust into prominence by being linked to or referred to by a large number of media sources having high visibility, it is possible to have the traffic on a single "peak" day far outweigh that of a typical day by orders of magnitude.

Conventional sampling mechanisms fail in such situations. A sampling rate that is appropriate for a website's normal level of traffic may be wholly inadequate for high-traffic days and may lead to system overloads and other performance problems. Using a different overall sampling rate to account for high-traffic days can result in drastic reduction of the overall size of the data set for normal-traffic days; the reduced data for normal traffic days then provides insufficient resolution for reporting on website visitation on those days.

What is needed, therefore, is an improved sampling mechanism that provides variable sample rates for website visitation analysis. What is further needed is a sampling mechanism that provides sufficient resolution for normal traffic days, but dynamically adjusts the sampling rate to account for high-traffic days.

SUMMARY OF THE INVENTION

The present invention provides a mechanism for sampling a data set according to a variable sample rate. A target number of samples per time period is established, and a baseline sample rate is determined. Data items in the data set are sampled according to the baseline sample rate, to obtain a sample set For time periods where the size of the resulting sample set exceeds the target number of samples, a new sample rate is established and the data items for the time period are resampled.

In one aspect, the baseline sample rate is selected so as to generate an appropriate number of sample items, taking into account reporting needs, desired resolution, performance factors, load factors, and the like, for normal amounts of data. In this manner, the present invention is able to handle spikes and other anomalies without sacrificing resolution for normal time periods.

Applied to website visitation analysis, the present invention is able to provide appropriate sampling capability for website traffic in normal time periods, while also being capable of handling spikes and other variations in website traffic as may take place in response to certain periodic or non-periodic events.

BRIEF DESCRIPTION OF THE DRAWINGS

The accompanying drawings illustrate several embodiments of the invention and, together with the description, serve to explain the principles of the invention.

FIGS. 3A and 3B depict examples of the variable sample rate methodology of the present invention.

One skilled in the art will recognize that these Figures are merely examples of the operation of the invention according to one embodiment, and that other architectures and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather, these embodiments are provided so that this disclosure will be complete and will fully convey the invention to those skilled in the art.

In particular, in the following description the invention is set forth with respect to sample rates for web traffic analysis. However, one skilled in the art will recognize that the sampling techniques described herein can be employed in any context where it is desirable to vary a sampling rate depending on the amount of incoming raw data. Accordingly, the particular context used herein for describing the invention is intended to be illustrative only, and is not intended to limit the scope of the invention in any way.

The system of the present invention is able to generate a data set that contains a preset amount of data for time period (such as a day), or that approximates a preset amount of data, even when the amount of incoming data differs substantially from one day to the next In this manner, the system of the present invention enables highly variable traffic to be tracked correctly without overloading servers and without undersampling.

Figure 1:
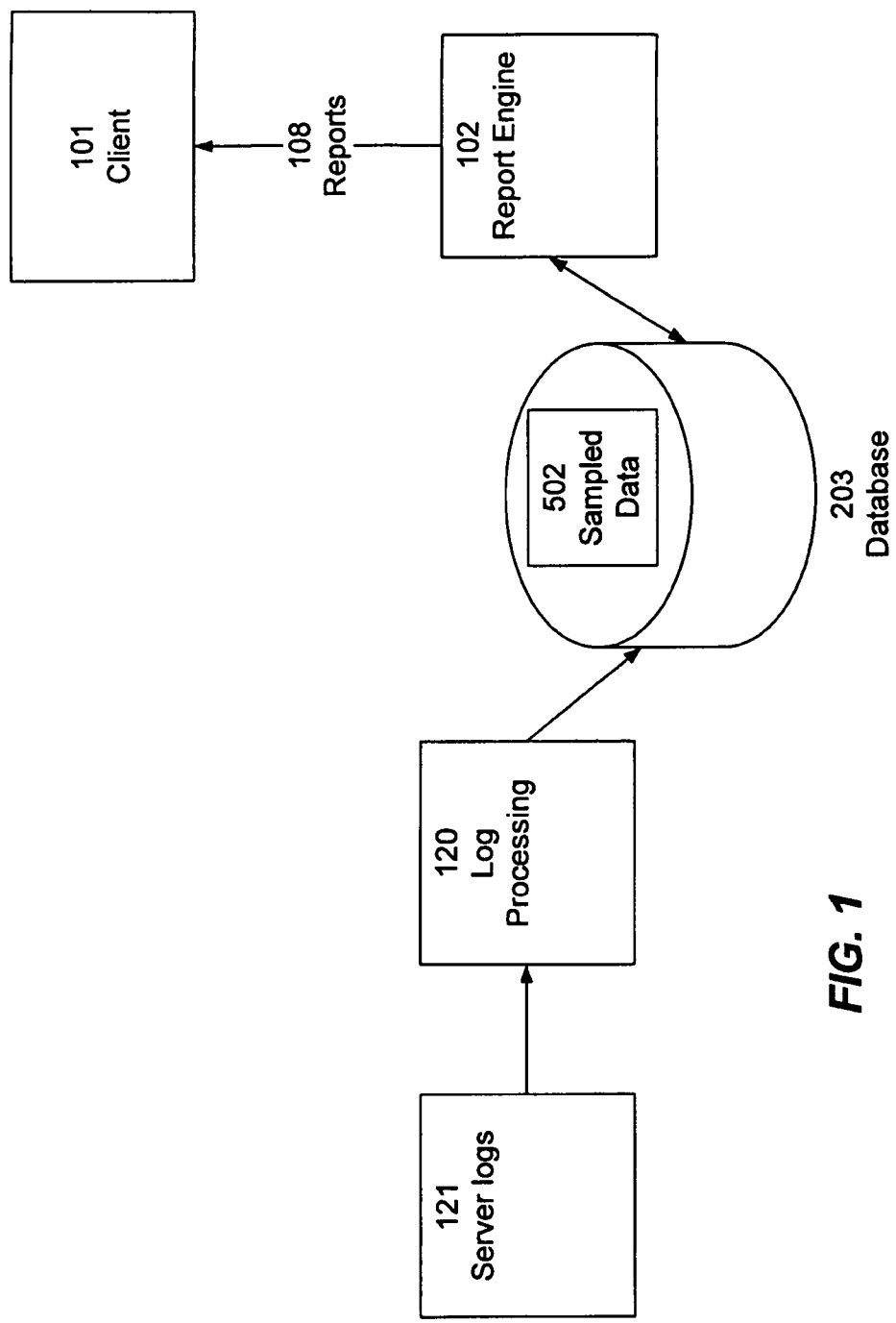
FIG. 1 is a block diagram depicting an architecture for providing variable sampling rates according to one embodiment of the present invention.

Referring now to FIG. 1, there is shown an example of an architecture for practicing the present invention. Server logs 121 contain raw data describing web traffic, as is recorded in a conventional manner by web servers. Log processing module 120 is a software component that samples data from server logs 121 and stores sampled data 502 in a storage area such as database 203 for retrieval by a report engine 102. In one embodiment, log processing module 120 is implemented as part of a traffic analysis server or other component specifically designed for web traffic analysis. In another embodiment, log processing module 120 is implemented as part of a web server or other hardware or software component, or it can be implemented as a software module running on a conventional personal computer that is being used for web traffic analysis. Log processing module 120 can perform sampling operations in real time (as data is recorded at server logs 121 and relayed to log processing module 120), or in a batch methodology, or upon demand when a request is made for web traffic data.

As described in more detail below, log processing module 120 performs the steps of the inventive method. In particular, log processing module 120 performs sampling operations on data from server logs 121 in a dynamic manner that takes into account a high degree of potential variability in website traffic.

Report engine 102 responds to client requests for data on website usage. This component can be implemented, for example, as a software module running on a server or conventional personal computer. One skilled in the art will recognize that the functionality performed by report engine 102 as described herein can be performed by a stand-alone component or by an integrated component that is part of a client machine, server, or the like.

Responsive to client requests, report engine 102 generates website visitation reports 108 based on sampled data 502 from database 203, and sends reports 108 to client 101 for display to a user. Alternatively, log processing module 120 can send sampled data 502 directly to report engine 102. Examples of website visitation reports 108 that can be so generated are described, for example, in related patent application Ser. No. 10/609,008 for CAPTURING AND PRESENTING SITE VISITATION PATH DATA, filed Jun. 27, 2003, the disclosure of which is incorporated herein by reference.

Figure 2:
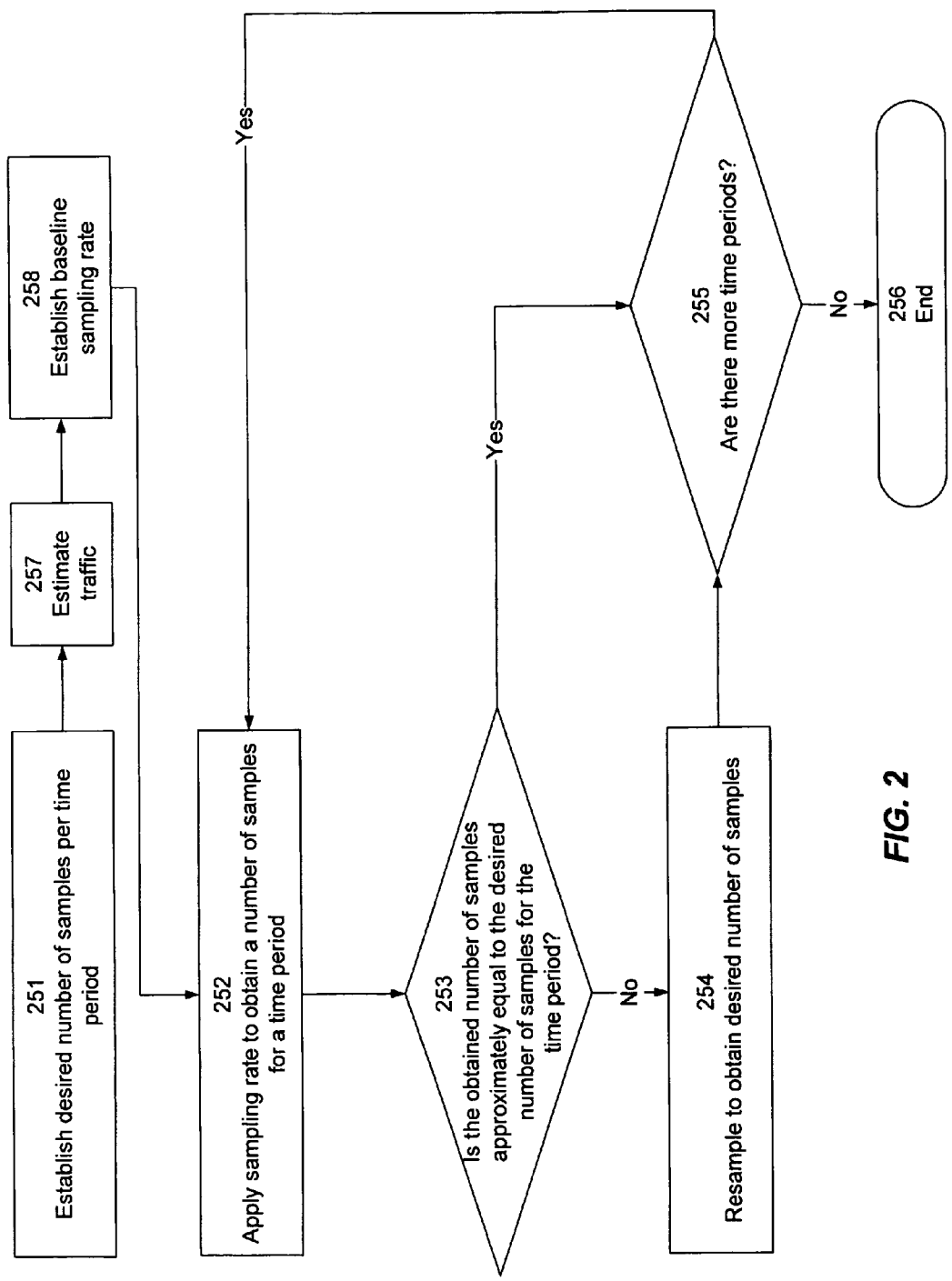
FIG. 2 is a flowchart depicting a method for providing variable sampling rates according to one embodiment of the present invention.

Referring now to FIG. 2, there is shown an example of the method of the present invention according to one embodiment. In one embodiment, the steps set forth in FIG. 2 are performed by log processing module 120, although one skilled in the art will recognize that such steps can be performed by any component, system, or module without departing from the essential characteristics of the present invention as claimed herein.

A target number of samples per time period (such as per day) is determined 251. This can be based, for example, on server load, data storage capacity, bandwidths, desired performance, administrator preferences, and the like. In one embodiment a range or tolerance factor is established. Estimated traffic is obtained 257 (based on any number of factors, including historical data, predictive analysis, competitive analysis and the like). From the target number of samples and the estimated traffic, a baseline sampling rate is established 258.

For example, suppose it is determined that, based on server load and data storage capacity, a target number of samples per day for a website is one million. If historical data and predicting analysis dictate an estimated average website visitation level on the order of 50 million page views per day, the baseline sampling rate is established at 1:50. Thus, for every fifty page views, data from one page view is stored for analysis.

Initially, this baseline sampling rate is applied 252 to obtain a number of samples for each time period. In one embodiment, this sampling rate is applied as incoming site visitation data is processed, so that an appropriate number of data elements are stored for analysis and reporting. As described above, however, in an alternative embodiment sampling can be performed in a batch process, for example on cached or stored log data.

Large traffic spikes can cause a particular time period to have an excessive number of samples when the baseline sampling rate is applied. For each time period, the system of the present invention checks 253 whether the number of samples obtained using the baseline sample rate is approximately equal to the target number of samples. In one embodiment, where a range or tolerance factor is established, the system determines whether the number of samples obtained falls within the range or tolerance factor.

If the obtained number of samples exceeds the target amount or range, the system resamples 254 the samples to obtain a number of samples approximating the target number. In one embodiment this resampling is performed on a time period by time period basis, so that resampling one time period does not have an effect on samples of other time periods.

In one embodiment, resampling is also done if the obtained number of samples falls substantially below the target number.

In one embodiment, resampling is performed by establishing a new sampling rate and repeating the sampling operation on the original raw data. The new sampling rate is determined, in one embodiment, by dividing the obtained number of samples by the desired number of samples, and then multiplying the denominator of the baseline sampling rate by the result. For example, if one million samples per day are desired, and five million samples are obtained using the baseline sampling rate of 1:50, the new sampling rates denominator is multiplied by 5,000,000/1,000,000=5, for a new sampling rate of 1:250.

In one embodiment, a determination that too many samples are being obtained can be made before all of the samples for the time period have been generated. A trend is detected, for example noting that the desired amount has been reached even though only a portion of the time period has been processed. In such a situation, the projected number of samples for the time period is determined and a new sampling rate determined based on such projection. For example, if one million samples (the desired daily number) are obtained by sampling for the first four hours of the day, a projection can be made that six million samples (1,000,000*24/4) will be obtained over the course of the day. In one embodiment, expected variations based on time of day can be used to adjust this projected amount (for example, a greater number of visits may take place from 9:00 am to 9:00 pm than from 9:00 pm to 9:00 am).

Resampling may be done by going back to the raw data and performing the sampling operation based on the raw data. Alternatively, resampling may be done by resampling the previously sample results. For example, in order to sample at a rate of 1:250, the previous results sampled at 1:50 can themselves be resampled at a resampling rate of 1:5 to obtain a net result equivalent to 1:250 sampling.

If additional time periods exist 255, the system returns to step 252 to obtain samples for a new time period. As stated above, in one embodiment an adjusted sampling rate for one time period has no effect on sampling rates for subsequent periods; rather, the original baseline sampling rate is again used as a starting point for subsequent periods. In another embodiment, the adjusted sampling rate for one period is used as a starting sampling rate for subsequent periods. Such a technique is useful if it is observed that high traffic levels often persist for more than one period in succession before tapering off. Otherwise, the method ends 256.

Referring now to FIGS. 3A and 3B, there are shown examples of the variable sample rate methodology of the present invention. A determination is made that 5 million samples are desired and that a typical daily traffic rate yields approximately 25 million data points (e.g. 25 million visits). Thus a baseline sample rate of 1:5 is established. In FIG. 3A, the sample rate of 1:5 is applied to original raw data set 501A for a one-day period of time, which includes 25 million data points. In the Figures, each dot represents one million data points or samples. The result of the baseline sampling is sampled data 502A including 5 million data points. Sampled data 502A is stored in database 203 for retrieval by a report engine 102 for further processing; alternatively sampled data 502A is sent directly to report engine 102 for processing.

In FIG. 3B, the baseline sample rate of 1:5 is applied to original raw data set 501B, which represents a peak day and includes 50 million data points. Thus, resulting sampled data 502B includes 10 million data points, which is determined to be too much for the system to handle (i.e., it exceeds a defined threshold and/or tolerance level). A new sampling rate of 1:10 is determined by dividing the obtained number of samples (10 million) by the desired number of samples (5 million), yielding a result of 2, and then multiplying the denominator of the baseline sampling rate (5) by the result (2) to generate a new sampling rate of 1:10.

The data is resampled by applying the 1:10 sample rate to the original data 501B, resulting in sample set 502C including 5 million samples. Alternatively, the data can be resampled by applying a 1:2 sample rate to the already-sampled data set 502B, to obtain sampled data 502A that includes 5 million samples. Sampled data 502C or 502D is stored in database 203 for retrieval by report engine 102 for further processing; alternatively sampled data 502C or 502D is sent directly to report engine 102 for processing.

By tracking data using potentially different sampling rates depending on the size of the sample set resulting from baseline sampling over a certain period of time (such as a day), the present invention allows resampling to be performed on a per-time-period basis—even within a single data set. This helps to ensure that appropriate sampling is performed to maintain sufficient resolution for reporting purposes, without overloading system resources.

In one embodiment, when report engine 102 processes sampled data 502 by retrieving the data from database 203, report engine 102 takes into account the sampling rate that was used. If variable sampling rates were used, the data is normalized so that accurate reports can be generated. The present invention thus provides accurate data for each individual date as well as for the data set as a whole, without sacrificing the sampling size of those days which did not receive as much traffic as the one spike.

In some situations, a requested report may require more data than the system would be able to handle using the baseline sampling rate. For example, a report may be requested that requires five years' worth of data, which at the baseline sampling rate would exceed the capabilities of the system. According to one embodiment, in such a situation the system resamples the data in order to reduce the data set to a more manageable size. This resampling occurs on the data set as a whole; the reporting subsystem then applies appropriate multipliers to provide the end user with the equivalent non-sampled numbers.

In one embodiment, resampling is performed at a different system component than initial sampling. The original sampled data 502 can be retained for further analysis if necessary. For example, in one embodiment initial sampling 252 takes place at log processing module 120, while resampling 254 takes place at report engine 102.

In one embodiment, the entirety of the unsampled data is also stored at a raw data warehouse (not shown). Thus, if another round of sampling is required using raw data, the data is available and can be retrieved for this purpose. For example, if it is determined that a more detailed report is needed at some later time after the data has already been sampled, the raw data can be retrieved and resampled at a rate that provides sufficient resolution for the more detailed report.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In particular, one skilled in the art will recognize that other architectures and analysis and processing techniques and mechanisms may be used, and that the present invention can be implemented using mechanisms other than those described above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for sampling a data set comprising a plurality of data items, comprising:
    establishing a target number of sample items to be extracted from a plurality of data items corresponding to a time period;
    establishing a tolerance factor;
    establishing a target range using the target number and the tolerance factor;
    establishing a first sampling rate for sampling the plurality of data items;
    applying, by a computer, the first sampling rate to the plurality of data items corresponding to the time period to obtain a first sample set comprising a first plurality of sample items, wherein the first sample set is a subset of the plurality of data items;
    determining, by the computer, a number of sample items contained in the first sample set; and
    responsive to the number of sample items contained in the first sample set being substantially different from the target number for the time period falling outside the target range:
        establishing a second sampling rate that is different from the first sampling rate; and
        applying, by the computer, the second sample sampling rate to the plurality of data items to obtain a second sample set comprising a second plurality of sample items.

2. The method of claim 1, wherein obtaining a applying the second sampling rate to obtain the second sample set comprises applying the second sampling rate to the plurality of data items corresponding to the time period.

3. The method of claim 1, wherein obtaining a applying the second sampling rate to obtain the second sample set comprises:
    establishing a resampling rate based on the second sampling rate and the first sampling rate; and
    applying the resampling rate to the first sample set.

4. The method of claim 3, wherein establishing the resampling rate comprises dividing the second sampling rate by the first sampling rate.

5. The method of claim 1, further comprising generating a report using at least one of the first and second sample sets.

6. The method of claim 1, wherein the plurality of data items describe website visits.

7. The method of claim 6, further comprising generating a website traffic report using at least one of the first and second sample sets.

8. The method of claim 1, wherein the time period comprises a day.

9. The method of claim 1, further comprising:
    applying the first sampling rate to the plurality of data items corresponding to a second time period to obtain an third sample set comprising a third plurality of sample items; and
    responsive to the third sample set containing an additional number of sample items for the second time period substantially different from the target number falling outside the target range, performing the steps of:
        establishing a third sampling rate; and
        obtaining a fourth sample set using the third sampling rate.

10. The method of claim 1, further comprising:
    applying the second sampling rate to the plurality of data items corresponding to a second time period to obtain a third sample set comprising a third plurality of sample items; and responsive to the third sample set containing an additional number of sample items for the second time period substantially different from the target number falling outside the target range, performing the steps of:
  establishing a third sampling rate; and
  obtaining a fourth sample set using the third sampling rate.

11. The method of claim 1, wherein establishing a target number the target range of sample items comprises establishing a target number the target range based on at least one selected from the group consisting of performance, traffic, load factors, storage space, and reporting needs.

12. The method of claim 1, wherein establishing a target number the target range of sample items comprises receiving a target number the target range.

13. The method of claim 1, wherein establishing the first sampling rate comprises establishing the first sampling rate based on the target number range of sample items for the time period and an expected number of data items for the time period.

14. The method of claim 1, wherein establishing the first sampling rate comprises receiving the first sampling rate.

15. A method for sampling a data set comprising a plurality of data items, each data item associated with a time period, comprising:
  establishing a target number of sample items to be extracted from a plurality of data items corresponding to one or more time periods;
  establishing a tolerance factor;
  establishing a target range using the target number and the tolerance factor;
  establishing a first sampling rate for sampling the plurality of data items;
  for each of the one or more time periods:
    applying, by a computer, the first sampling rate to the plurality of data items corresponding to the time period to obtain a first sample set comprising a first plurality of sample items for a given time period of the one or more time periods, wherein the first sample set is a subset of the plurality of data items corresponding to the particular given time period; and
    determining, by the computer, a number of sample items contained in the first sample set;
    responsive to the number of sample items contained in the first sample set for the time period being substantially different from the target number for the given time period falling outside the target range:
    establishing a second sampling rate for the given time period, wherein the second sampling rate is different from the first sampling rate; and
    applying, by the computer, the second sample sampling rate to the plurality of data items corresponding to the given time period to obtain a second sample set for the given time period using the second sampling rate, wherein the second sample set comprises a second plurality of sample items.

16. A computer program product for sampling a data set comprising a plurality of data items, comprising:
  a non-transitory computer-readable storage medium; and
  computer program code, encoded on the non-transitory computer-readable storage medium, for:
    establishing a target range of sample items to be extracted from a plurality of data items corresponding to a time period;
    establishing a tolerance factor;
    establishing a target range using the target number and the tolerance factor;
    establishing a first sampling rate for sampling the plurality of data items;
    applying the first sampling rate to the plurality of data items corresponding to the time period to obtain a first sample set comprising a first plurality of sample items, wherein the first sample set is a subset of the plurality of data items;
    determining a number of sample items contained in the first sample set; and
    responsive to the number of sample items contained in the first sample set being substantially different from the target number for the time period falling outside the target range:
      establishing a second sampling rate that is different from the first sampling rate; and
      applying the second sample sampling rate to the plurality of data items to obtain a second sample set comprising a second plurality of sample items.

17. The computer program product of claim 16, wherein the computer program code for obtaining a applying the second sampling rate to obtain the second sample set comprises computer program code for applying the second sampling rate to the plurality of data items corresponding to the time period.

18. The computer program product of claim 16, wherein the computer program code for obtaining a applying the second sampling rate to obtain the second sample set comprises computer program code for:
  establishing a resampling rate based on the second sampling rate and the first sampling rate; and
  applying the resampling rate to the first sample set.

19. The computer program product of claim 18, wherein the computer program code for establishing the resampling rate comprises computer program code for dividing the second sampling rate by the first sampling rate.

20. The computer program product of claim 16, further comprising computer program code for generating a report using at least one of the first and second sample sets.

21. The computer program product of claim 16, wherein the plurality of data items describe website visits.

22. The computer program product of claim 21, further comprising computer program code for generating a website traffic report using at least one of the first and second sample sets.

23. The computer program product of claim 16, wherein the time period comprises a day.

24. The computer program product of claim 16, further comprising computer program code for:
  applying the first sampling rate to the plurality of data items corresponding to a second time period to obtain an third sample set comprising a third plurality of sample items; and
  responsive to the third sample set containing an additional number of sample items for the second time period substantially different from the target number falling outside the target range:
    establishing a third sampling rate; and
    obtaining a fourth sample set using the third sampling rate.

25. The computer program product of claim 16, further comprising computer program code for:
  applying the second sampling rate to the plurality of data items corresponding to a second time period to obtain an third sample set comprising a third plurality of sample items; and responsive to the third sample set containing an additional number of sample items for the second time period substantially different from the target number falling outside the target range:
    establishing a third sampling rate; and
    obtaining a fourth sample set using the third sampling rate.

26. The computer program product of claim 16, wherein the computer program code for establishing a target number the target range of sample items comprises computer program code for establishing a target number the target range based on at least one selected from the group consisting of performance, traffic, load factors, storage space, and reporting needs.

27. The computer program product of claim 16, wherein the computer program code for establishing a target number the target range of sample items comprises computer program code for receiving a target number the target range.

28. The computer program product of claim 16, wherein the computer program code for establishing the first sampling rate comprises computer program code for establishing the first sampling rate based on the target number range of sample items for the time period and an expected number of data items for the time period.

29. The computer program product of claim 16, wherein the computer program code for establishing the first sampling rate comprises computer program code for receiving the first sampling rate.

30. A computer system for sampling a data set comprising a plurality of data items, comprising:
    a processor configured to execute instructions embodied in a storage device and comprising a log processing module configured for:
        establishing a target number of sample items to be extracted from a plurality of data items corresponding to a time period,
        establishing a tolerance factor;
        establishing a target range using the target number and the tolerance factor;
        establishing a first sampling rate for sampling the plurality of data items;
        applying the first sampling rate to the plurality of data items corresponding to the time period to obtain a first sample set comprising a first plurality of sample items, wherein the first sample set is a subset of the plurality of data items;
        determining a number of sample items contained in the first sample set; and
        responsive to the number of sample items contained in the first sample set being substantially different from the target number falling outside the target range:
            establishing a second sampling rate that is different from the first sampling rate; and
            applying the second sample sampling rate to the plurality of data items to obtain a second sample set comprising a second plurality of sample items; and
    wherein the storage device is configured for storing at least one of the first and second sample sets.

31. The system of claim 30, wherein the log processing module obtains a is configured for applying the second sampling rate to the plurality of data items to obtain the second sample set by applying the second sampling rate to the plurality of data items corresponding to the time period.

32. The system of claim 30, wherein the log processing module obtains a is configured for applying the second sampling rate to the plurality of data items to obtain the second sample set by:
    establishing a resampling rate based on the second sampling rate and the first sampling rate; and
    applying the resampling rate to the first sample set.

33. The system of claim 32, wherein the log processing module establishes a is configured for establishing the resampling rate by dividing the second sampling rate by the first sampling rate.

34. The system of claim 30, further comprising a report generator module configured for generating a report using at least one of the first and second sample sets.

35. The system of claim 30, wherein the plurality of data items describe website visits.

36. The system of claim 35, further comprising a report generator, for generating a website traffic report using at least one of the first and second sample sets.

37. The system of claim 30, wherein the time period comprises a day.

38. The system of claim 30, wherein the log processing module is further configured for:
    the log processing module applies applying the first sampling rate to the plurality of data items corresponding to a second time period to obtain an third sample set comprising a third plurality of sample items; and
    responsive to the third sample set containing an additional number of sample items for the second time period substantially different from the target number, the log processing module falling outside the target range:
        establishes establishing a third sampling rate; and
        obtains obtaining a fourth sample set using the third sampling rate.

39. The system of claim 30, wherein the log processing module is further configured for:
    the log processing module applies applying the second sampling rate to the plurality of data items corresponding to a second time period to obtain an third sample set comprising a third plurality of sample items; and
    responsive to the third sample set containing an additional number of sample items for the second time period substantially different from the target number, the log processing module falling outside the target range:
        establishes establishing a third sampling rate; and
        obtains obtaining a fourth sample set using the third sampling rate.

40. The system of claim 30, wherein the log processing module establishes a target number is configured for establishing the target range of sample items by establishing a target number the target range based on at least one selected from the group consisting of performance, traffic, load factors, storage space, and reporting needs.

41. The system of claim 30, wherein the log processing module establishes a target number is configured for establishing the target range of sample items by receiving a target number the target range.

42. The system of claim 30, wherein the log processing module establishes a target number is configured for establishing the first sampling rate by establishing the first sampling rate based on the target number range of sample items for the time period and an expected number of data items for the time period.

43. The system of claim 30, wherein the log processing module establishes a target number is configured for establishing the first sampling rate by receiving the first sampling rate.

* * * * *

UNITED STATES PATENT AND TRADEMARK OFFICE
CERTIFICATE OF CORRECTION

PATENT NO.         : 8,578,041 B2
APPLICATION NO.    : 11/319337
DATED              : November 5, 2013
INVENTOR(S)        : Christopher Reid Error It is certified that error appears in the above-identified patent and that said Letters Patent is hereby corrected as shown below:

In the Claims:

Column 8, Claim 1, Line 20
Delete the words "being substantially different from the target number"
Column 8, Claim 1, Line 25
Delete the word "sample"

Column 8, Claim 2, Line 29
Delete the words "obtaining a"

Column 8, Claim 3, Line 33
Delete the words "obtaining a"

Column 8, Claim 9, Lines 57-58
Delete the words "substantially different from the target number"

Column 9, Claim 10, Lines 2-3
Delete the words "substantially different from the target number"

Column 9, Claim 11, Lines 8-9
Delete the words "a target number"
Column 9, Claim 11, Line 10
Delete the words "a target number"

Column 9, Claim 12, Lines 13-14
Delete the words "a target number"
Column 9, Claim 12, Line 15
Delete the words "a target number"
Column 9, Claim 12, Line 18
Delete the word "number"

Signed and Sealed this
Seventeenth Day of June, 2014

Michelle K. Lee
*Deputy Director of the United States Patent and Trademark Office*

Column 9, Claim 15, Line 41
Delete the word "particular"
Column 9, Claim 15, Lines 45-46
Delete the words "being substantially different from the target number"
Column 9, Claim 15, Line 51
Delete the word "sample"

Column 10, Claim 16, Lines 12-13
Delete the words "being substantially different from the target number"
Column 10, Claim 16, Line 17
Delete the word "sample"

Column 10, Claim 17, Line 21
Delete the words "obtaining a"

Column 10, Claim 18, Line 27
Delete the words "obtaining a"

Column 10, Claim 24, Lines 56-57
Delete the words "substantially different from the target number"

Column 11, Claim 25, Lines 2-3
Delete the words "substantially different from the target number"

Column 11, Claim 26, Line 9
Delete the words "a target number"
Column 11, Claim 26, Line 11
Delete the words "a target number"

Column 11, Claim 27, Line 16
Delete the words "a target number"
Column 11, Claim 27, Line 18
Delete the words "a target number"

Column 11, Claim 28, Line 22
Delete the word "number"

Column 11, Claim 30, Lines 50-51
Delete the words "being substantially different from the target number"
Column 11, Claim 30, Line 54
Delete the word "sample"

Column 11, Claim 31, Line 59
Delete the words "obtains a"

Column 11, Claim 32, Line 65
Delete the words "obtains a"

Column 12, Claim 33, Line 5
Delete the words "establishes a"

Column 12, Claim 38, Line 21
Delete the words "the log processing module applies"
Column 12, Claim 38, Lines 26-27
Delete the word "substantially different from the target number, the log processing module"
Column 12, Claim 38, Line 29
Delete the word "establishes"
Column 12, Claim 38, Line 30
Delete the word "obtains"

Column 12, Claim 39, Line 34
Delete the words "the log processing module applies"
Column 12, Claim 39, Lines 40-42
Delete the words "substantially different from the target number, the log processing module"
Column 12, Claim 39, Line 43
Delete the word "establishes"
Column 12, Claim 39, Line 44
Delete the word "obtains"

Column 12, Claim 40, Line 47
Delete the words "establishes a target number"
Column 12, Claim 40, Lines 48-49
Delete the words "a target number"

Column 12, Claim 41, Line 53
Delete the words "establishes a target number"
Column 12, Claim 41, Lines 54-55
Delete the words "a target number"

Column 12, Claim 42, Line 56
Delete the words "establishes a target number"
Column 12, Claim 42, Lines 58
Delete the word "number"

Column 12, Claim 43, Line 62
Delete the words "establishes a target number"